May 16, 1939.  L. L. CADWELL  2,158,106
CARCASS TREATMENT
Filed Oct. 11, 1937  2 Sheets-Sheet 2

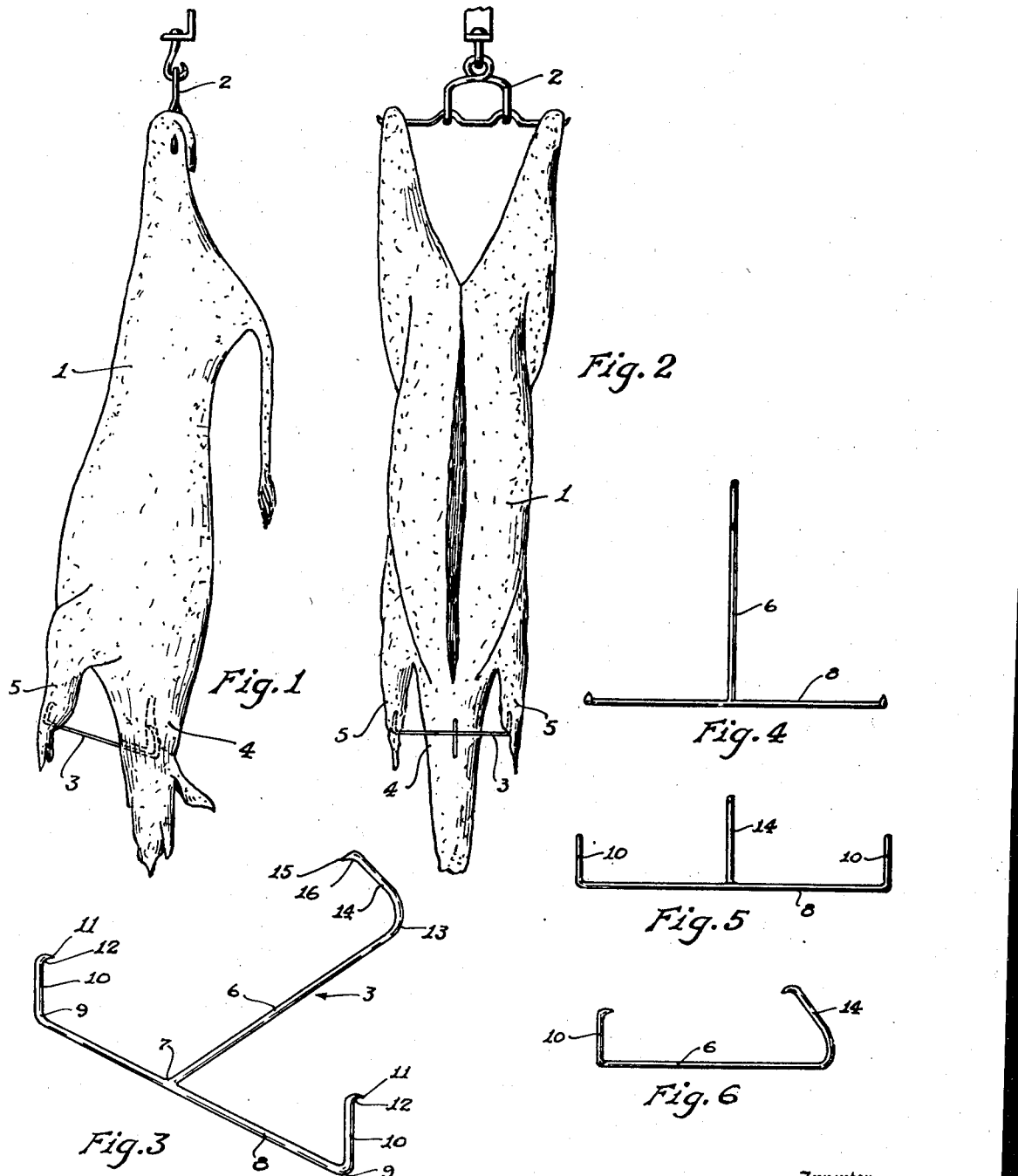

Inventor
Leon L. Cadwell

Patented May 16, 1939

2,158,106

UNITED STATES PATENT OFFICE 2,158,106

CARCASS TREATMENT

Leon L. Cadwell, Chicago, Ill., assignor to Industrial Patents Corporation, Chicago, Ill., a corporation of Delaware Application October 11, 1937, Serial No. 168,487

4 Claims. (Cl. 17—44)

This invention relates to the treatment of meat carcasses.

This application is a continuation in part of my copending application, Serial No. 115,051, filed December 9, 1936, entitled Calf carcass treatment.

One of the objects of the invention is to provide an improved method of treating animal carcasses.

Another object of the invention resides in the treatment of animal carcasses to provide improved forequarter cuts thereof.

Other objects of the invention will be apparent from the description and claims which follow.

One form of means which may be employed for carrying out the method of the present invention is described and claimed in my copending application, Serial No. 168,488, filed October 11, 1937, entitled Carcass treatment means.

The present invention is directed to the treatment of animal carcasses in which the foreshanks, forequarters and neck of a freshly killed carcass are secured in relative predetermined position. In accordance with the invention a substantially T-shaped, three-point hook member is inserted between the spinal cord cavity and the foreshanks of the carcass, preferably while the carcass is still warm, and is left remaining in position until rigor mortis or chilling of the carcass has been completed.

The muscular formation and bone positions of the forequarter cuts of carcasses, treated in accordance with the method of the present invention, are greatly improved, thus providing cuts more pleasing in appearance and capable of commanding the better price in the retail market.

The method of the present invention is also of particular importance in the skinning and bagging of whole animal carcasses for shipment to remote points, in that the neck and foreshanks are suitably aligned relative to the body and brisket of the carcass, thus permitting use of a smaller size bag and also facilitating its application.

Attention is directed to the drawings in which there is depicted means which may be employed for carrying out the method of the present invention.

Figure 1 is a side view of a carcass treated in accordance with the present invention.

Figure 2 is a front view of the carcass shown in Figure 1.

Figure 3 is a perspective view showing one embodiment of the device which may be employed in the method of the present invention.

Figure 4 is a plan view of the device shown in Figure 3.

Figure 5 is a front view of the device shown in Figure 3.

Figure 6 is a side view of the device shown in Figure 3.

Figure 7:
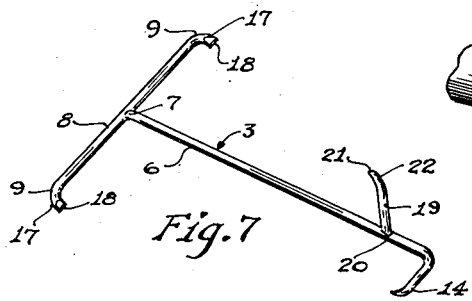
Figure 7 is a perspective view, showing another form of the device which may be employed in the method of the present invention.
Figure 10:
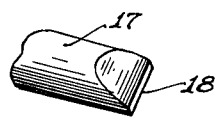
Figure 10 is an enlarged detail view of the pointed members 18 of the device shown in Figure 7.

In carrying out the method of the present invention, freshly killed carcass 1, while still in a warm condition, may be suitably suspended from suspension means 2 for the application of hook member 3 between the neck 4 and foreshanks 5.

In the embodiment of the invention exemplified in Figures 3 to 6, inclusive, hook member 3, of substantially T-shaped configuration, comprises central member 6 rigidly secured at one of its ends 7 to cross member 8. The ends of cross member 8 are bent upwardly substantially at right angle, as at 9, thus providing prongs 10. The free ends of prongs 10 are pointed, as at 11, and are bent inwardly, as at 12. The opposite end of central member 6 may be broadly curved upwardly and inwardly, as at 13 thus providing prong 14. The free end of prong 14 is pointed, as at 15, and bent inwardly toward prongs 10, as at 16.

In applying hook member 3, prong 14, as shown in Figure 1, is inserted upwardly through the spinal cord cavity of the carcass and secured as by pointed end 15. The neck and foreshanks of the carcass are then retracted relative to each other by an operator and each of the prongs 10 secured within its respective foreshank. Prongs 10 are preferably secured by pointed ends 11 in the hollows made by the bone knuckles and main leg tendons.

In the embodiment of the invention exemplified in Figures 7 to 10, inclusive, there is disclosed a modified form of hook member 3 which is adapted for use over a considerably wide range of carcass sizes. In this embodiment it will be seen that the free ends of cross member 8 are bent inwardly substantially at right angle, as at 9, thus providing prongs 17 each extending in a line substantially parallel with central member 6. The free end of each of the prongs 17 is flattened as at 18, to a chisel-like edge and serve to secure the foreshanks in relative position. The form of chisel-like edge 18 is more specifically shown in detail in Figure 10.

Figure 8:
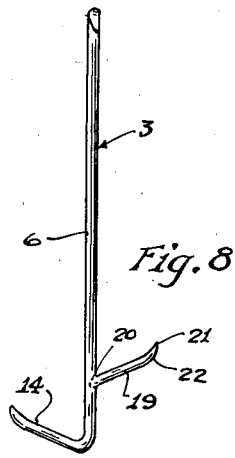
Figure 8 is a side view of the device shown in Figure 7.
Figure 9:
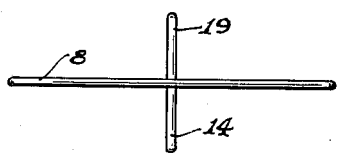
Figure 9 is an end view of the device shown in Figure 7.

As shown in Figures 7 and 8, a second prong member 19 is welded or otherwise rigidly secured, as at 20, to and intermediate the ends of central member 6. It will be noted that prong 19 is pointed, as at 21, and is bent inwardly, as at 22, and is in every respect similar to prong 14, except that it is relatively nearer the edges 18 of prongs 17, and, further, except that it extends from central member 6 in a relatively opposite direction. It will further be noted that the edges 18 of prongs 17 are reversible as to either of the foreshanks of the carcass and may be used interchangeably with either of the prongs 14 or 19.

The purpose of prongs 14 and 19 is to care for the differences in the carcass sizes with which this embodiment of the invention may be used.

Figure 11:
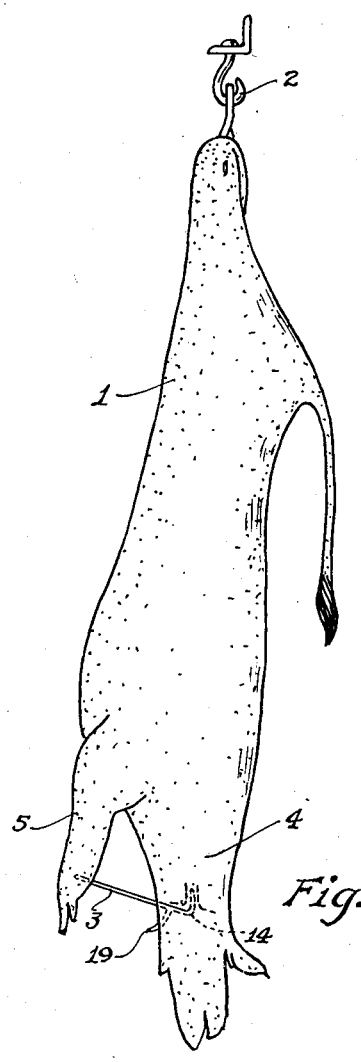
Figures 11 and 12 are side views of carcasses treated in accordance with the method of the present invention in which there is employed the device shown in Figure 7.
Figure 12:

In Figure 11 the hook member is shown as applied to a carcass of relatively large size in which the prong member 14 is used in combination with prong members 10. In Figure 12 the hook member 12 is shown applied to a carcass of relatively smaller size in which prong member 19 is used in combination with prong member 17.

In practice, the hook members of the present invention are preferably applied to the freshly killed carcass, while still in a warm condition, and are left remaining in position until rigor mortis or chilling of the carcass has been completed. After completion of rigor mortis or chilling of the treated carcass, the hook member may be removed, it being found that the neck and foreshanks will rigidly remain in placed position without its aid.

It is further found that the bone positions and muscular formations secured by the method of the present invention provide improved forequarter cuts having a more plump and stockier appearance. This condition is due, in part, to the spreading of the foreshanks relative to the prongs 10 or 17, and, in part, to the relative retraction of the neck and foreshanks.

It will be seen that the neck and foreshanks of carcasses treated according to the present invention, are suitably aligned relative to the body and brisket of the carcass, and thus are especially adapted for bagging for shipment to remote points, it being found that smaller, more tight fitting bags may be used and that danger of puncturing the bags by the protruding foreshanks is greatly minimized.

I claim:

1. The method of treating animal carcasses which comprises securing the neck and foreshanks in a relatively retracted position.

2. The method of treating animal carcasses which comprises securing the neck and foreshanks in a relatively retracted position until completion of rigor mortis.

3. The method of treating animal carcasses which comprises laterally spreading the foreshanks and securing the neck and spread foreshanks in relatively retracted position.

4. The method of treating animal carcasses which comprises laterally spreading the foreshanks and securing the neck and spread foreshanks in relatively retracted position until completion of rigor mortis.

LEON L. CADWELL.